(12) United States Patent
McGowan et al.

(10) Patent No.: US 11,465,808 B2
(45) Date of Patent: Oct. 11, 2022

(54) ERGONOMIC CASE/ACCESSORY FOR A MOBILE DEVICE

(71) Applicant: Ambulant, Inc., San Rafael, CA (US)

(72) Inventors: Joseph Cole McGowan, San Rafael, CA (US); Harry William McGowan, III, Chico, CA (US)

(73) Assignee: Ambulant, Inc., San Rafael, CA (US)

( * ) Notice: Subject to any disclaimer, the term of this patent is extended or adjusted under 35 U.S.C. 154(b) by 0 days.

(21) Appl. No.: 14/577,972

(22) Filed: Dec. 19, 2014

(65) Prior Publication Data

US 2015/0175309 A1    Jun. 25, 2015

Related U.S. Application Data

(60) Provisional application No. 61/918,379, filed on Dec. 19, 2013.

(51) Int. Cl.
| | |
|---|---|
| *A45F 5/00* | (2006.01) |
| *B65D 25/28* | (2006.01) |
| *G06F 1/16* | (2006.01) |
| *H04B 1/3888* | (2015.01) |
| *F16M 13/04* | (2006.01) |
| *F16M 11/38* | (2006.01) |
| *F16M 11/22* | (2006.01) |
| *F16M 13/00* | (2006.01) |
| *A45F 5/10* | (2006.01) |

(52) U.S. Cl.
CPC ............ *B65D 25/2882* (2013.01); *A45F 5/00* (2013.01); *A45F 5/10* (2013.01); *F16M 11/22* (2013.01); *F16M 11/38* (2013.01); *F16M 13/00* (2013.01); *F16M 13/04* (2013.01); *G06F 1/1656* (2013.01); *H04B 1/3888* (2013.01); *A45F 2200/0516* (2013.01); *A45F 2200/0525* (2013.01); *G06F 2200/1633* (2013.01)

(58) Field of Classification Search
CPC ........ A45F 2005/008; A45F 2200/0508; A45F 2200/0516; A45F 2200/0525; A45C 2011/001–003; H04B 1/3888; H04B 2001/3861; Y10S 224/93; A47G 1/143
USPC .................. D14/250; D3/218; 224/217, 930; 361/679.59; 248/688
See application file for complete search history.

(56) References Cited

U.S. PATENT DOCUMENTS

| | | | | |
|---|---|---|---|---|
| 5,490,658 A | * | 2/1996 | Coward | A61M 5/1417 215/399 |
| RE36,258 E | * | 7/1999 | Coward | A61M 5/1417 215/399 |
| 6,625,283 B1 | * | 9/2003 | Sato | G06F 1/1626 379/368 |
| D559,229 S | * | 1/2008 | Griffin | D14/217 |

(Continued)

FOREIGN PATENT DOCUMENTS

| | | | |
|---|---|---|---|
| JP | 2002330203 A | * 11/2002 | |
| WO | WO 2014181365 A1 | * 11/2014 | F16M 13/00 |

*Primary Examiner* — Scott T McNurlen
(74) *Attorney, Agent, or Firm* — Buchalter; Jason W. Croft

(57) ABSTRACT

An electronic device case including a case body to encase a handheld electronic device, the case body including at least one planar surface, and one or more wings to fold into the planar surface in a first position and to extend past an edge of the at least one planar surface in a second position. The one or more wings provide handles by which a user of the handheld electronic device can support a weight of the handheld electronic device.

18 Claims, 11 Drawing Sheets

(56) References Cited

U.S. PATENT DOCUMENTS

| | | | | |
|---|---|---|---|---|
| D663,294 S * | 7/2012 | Buxton | ........................ | D14/250 |
| 8,267,368 B2 * | 9/2012 | Torii | ...................... | F16M 13/00 |
| | | | | 248/188.8 |
| D684,356 S * | 6/2013 | Pegg | ............................. | D3/218 |
| 8,490,789 B2 * | 7/2013 | Lach | ...................... | A45C 11/00 |
| | | | | 206/320 |
| 9,179,565 B2 * | 11/2015 | Cho | ........................ | H05K 7/00 |
| 2009/0270050 A1 * | 10/2009 | Brown | ...................... | A45F 5/00 |
| | | | | 455/90.3 |
| 2011/0084081 A1 * | 4/2011 | Chung | ................... | A45C 11/00 |
| | | | | 220/628 |
| 2012/0031937 A1 * | 2/2012 | Baker | .................... | A45C 11/00 |
| | | | | 224/217 |
| 2012/0262854 A1 * | 10/2012 | Robert | ................... | G06F 1/166 |
| | | | | 361/679.01 |
| 2013/0113229 A1 * | 5/2013 | Wu | .......................... | A45F 5/10 |
| | | | | 294/138 |
| 2013/0277992 A1 * | 10/2013 | Senoff | ....................... | A45F 5/00 |
| | | | | 294/25 |
| 2014/0027482 A1 * | 1/2014 | Crawford | ................ | A45F 5/102 |
| | | | | 224/197 |
| 2014/0084035 A1 * | 3/2014 | Georges | .................... | A45F 5/00 |
| | | | | 224/267 |
| 2014/0124388 A1 * | 5/2014 | McGowan | ............ | G06F 1/1626 |
| | | | | 206/37 |
| 2015/0351525 A1 * | 12/2015 | Sadai | ........................ | A45F 5/10 |
| | | | | 294/141 |
| 2015/0372705 A1 * | 12/2015 | Fiorentino | ............ | H04B 1/385 |
| | | | | 455/575.6 |
| 2016/0045002 A1 * | 2/2016 | Butts | ...................... | A45C 11/00 |
| | | | | 224/191 |

* cited by examiner

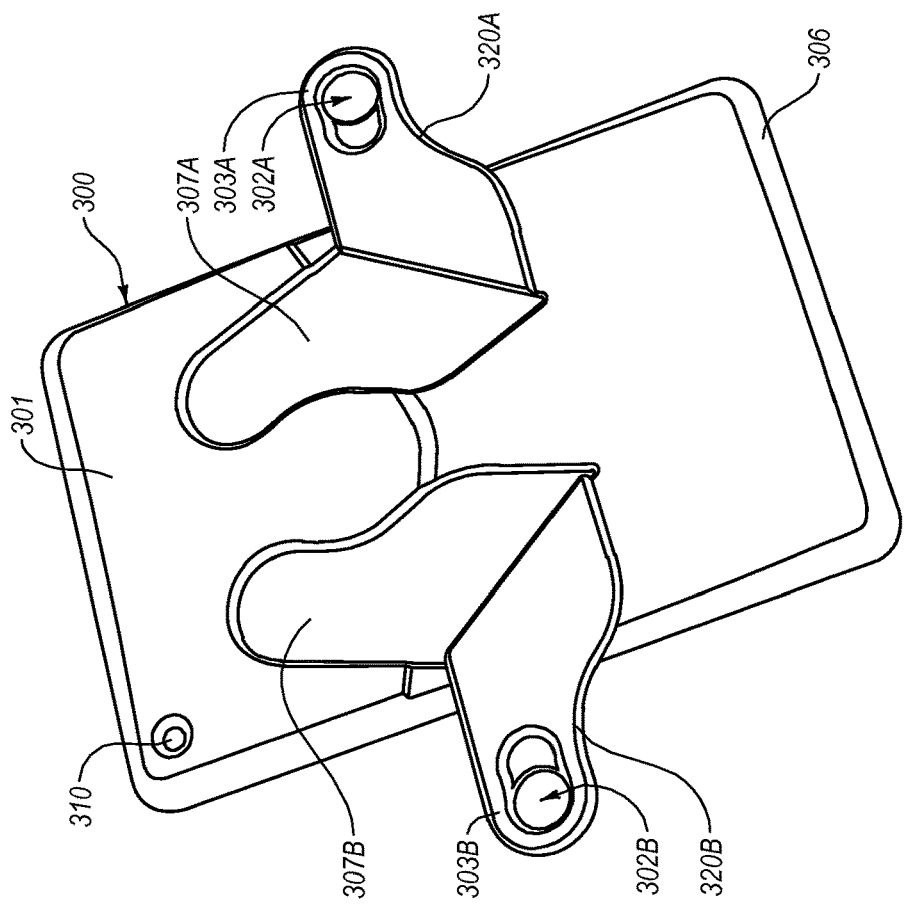
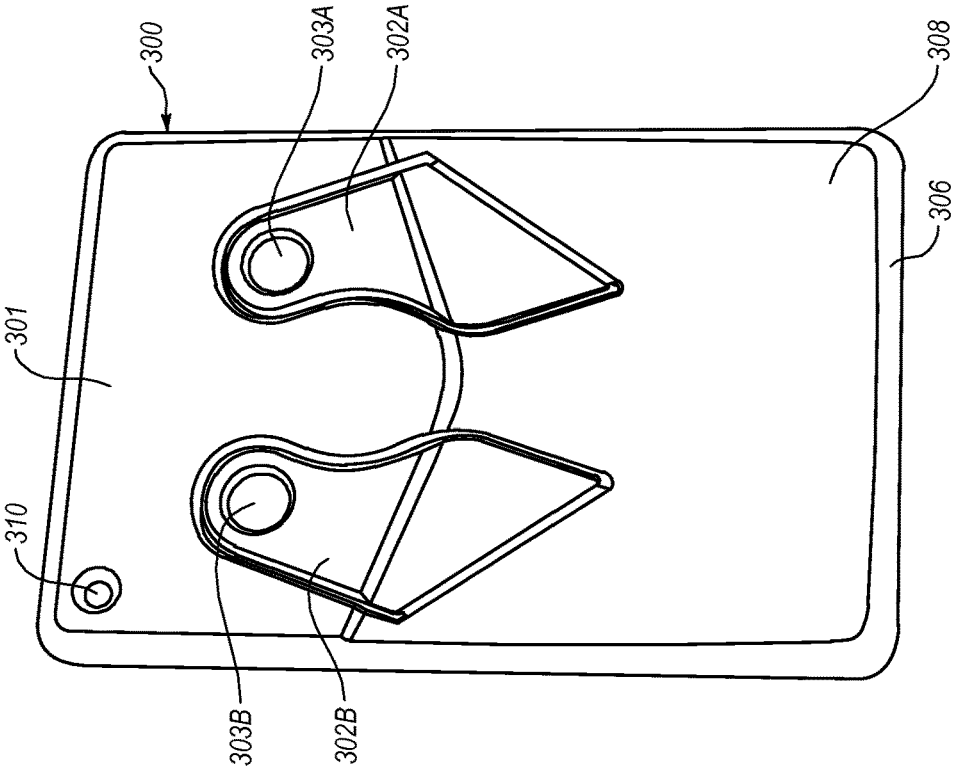
Fig. 3B
Fig. 3A

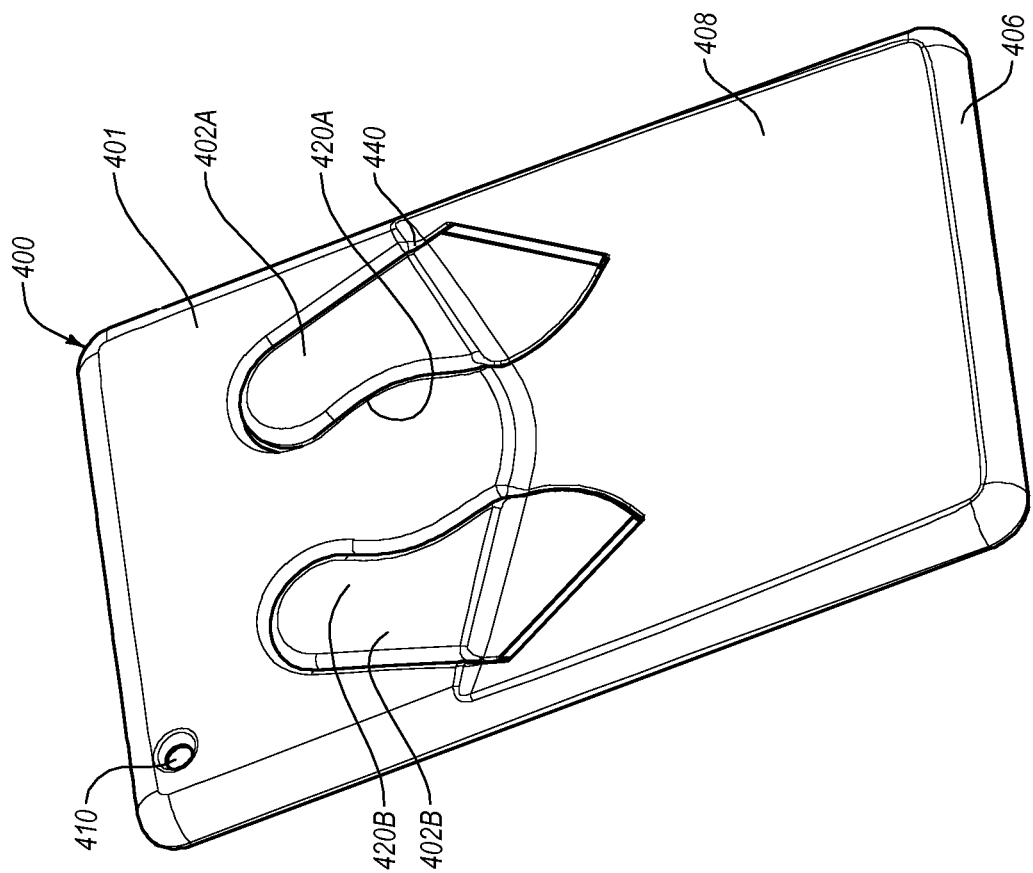
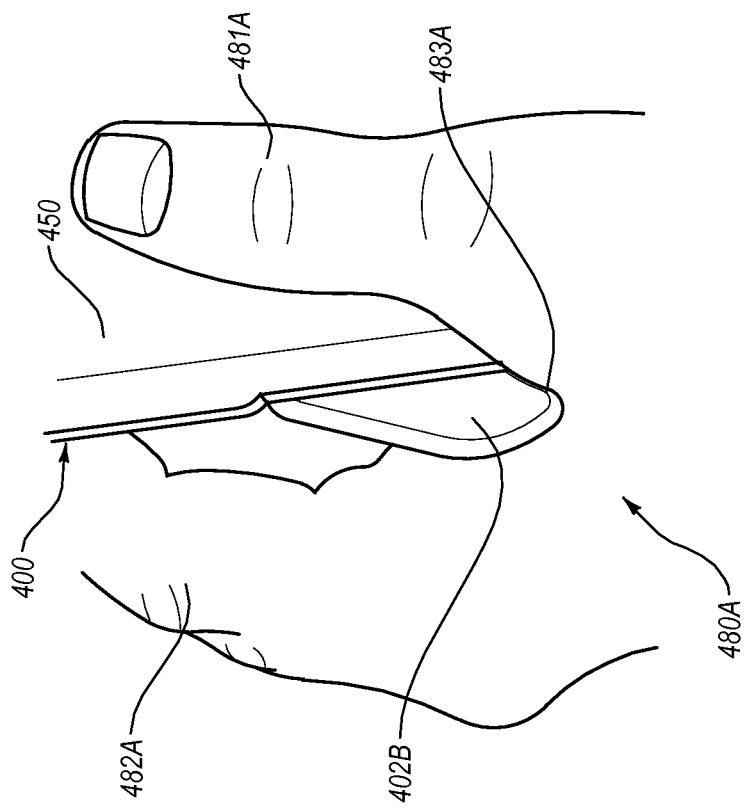
Fig. 4C
Fig. 4B

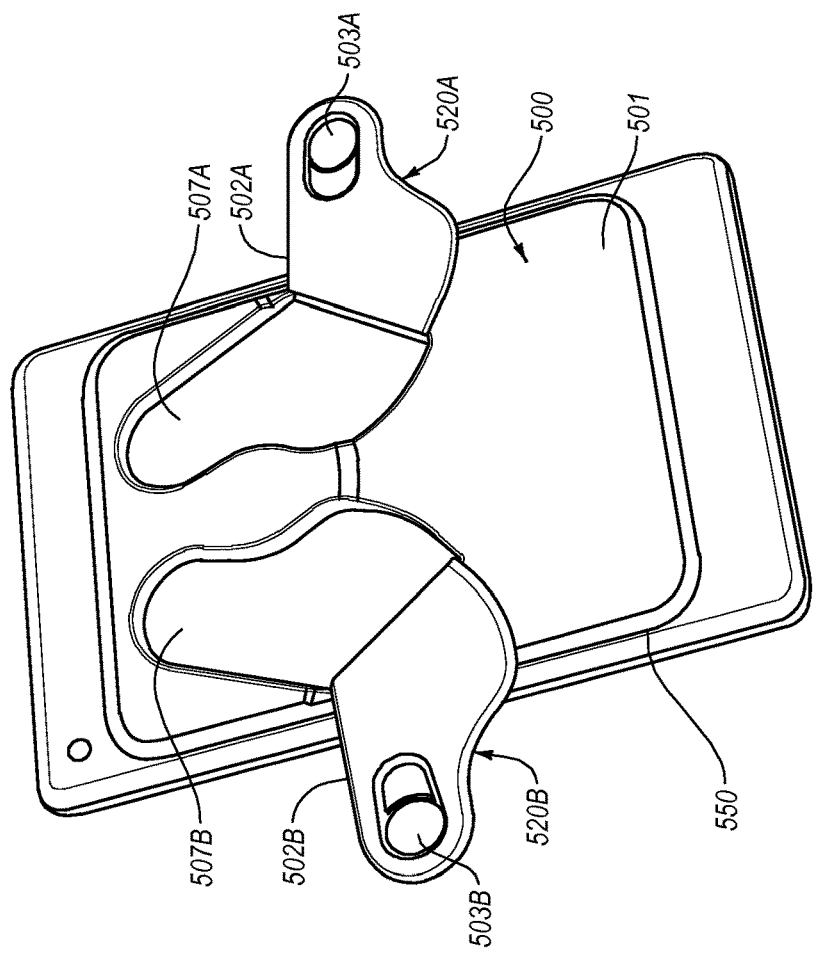
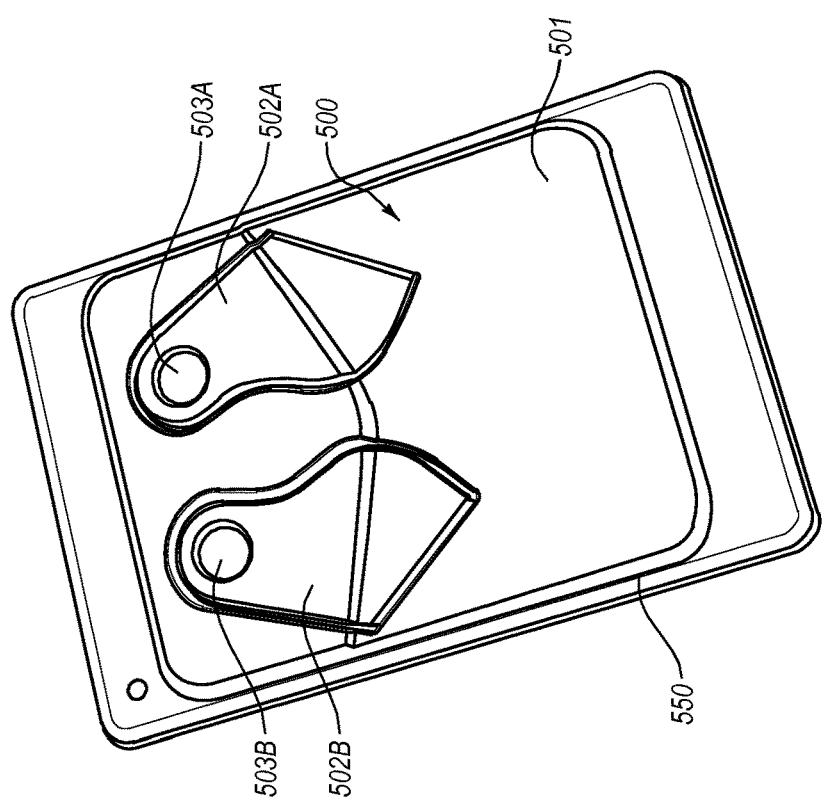
Fig. 5B
Fig. 5A

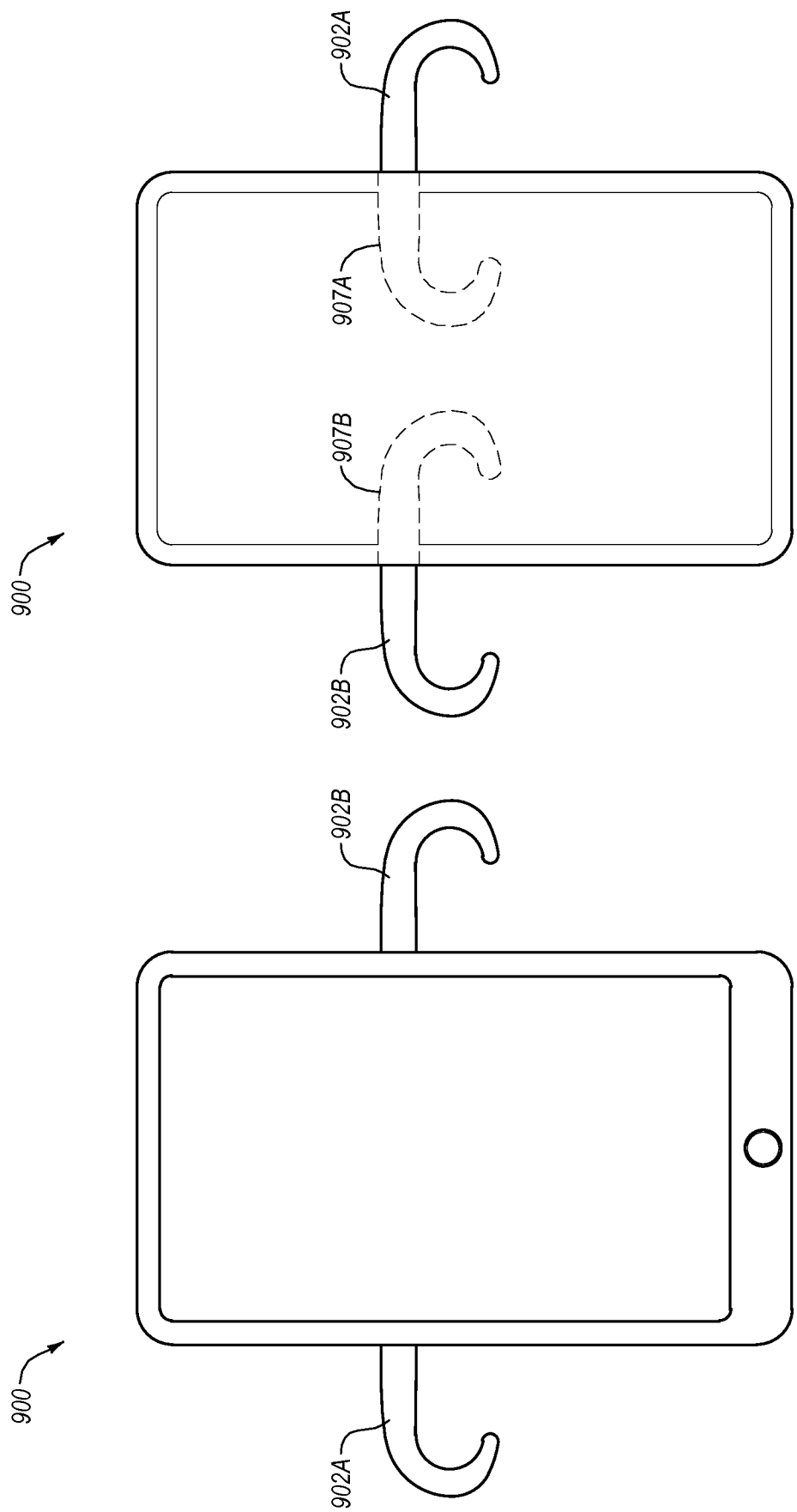

ERGONOMIC CASE/ACCESSORY FOR A MOBILE DEVICE

RELATED APPLICATION

This application claims the benefit of U.S. Provisional Application No. 61/918,379, filed on Dec. 19, 2013, the content of which is incorporated herein by reference in its entirety.

TECHNICAL FIELD

Embodiments of the present disclosure relate to a case/accessory for mobile device, and, more particularly, to an ergonomic case/accessory to for holding a mobile device.

BACKGROUND

Mobile devices, such as tablets, eReaders, mobile phones, gaming devices, and other handheld electronic devices, have grown dramatically in popularity. These devices sometimes have touchscreens where users can operate the device by touching certain parts of the screen. These devices can additionally or alternatively have various buttons or other fixed parts for operating the device. In one method of utilizing these devices, users can perform various desired activities by grasping the device in one or both hand and using either one or more thumbs or fingers to touch the screen and/or press buttons.

However, supporting the weight of these devices can be tiring for a user and require uncomfortable or unnatural positioning of one or more hands to firmly grip and operate the device. Users can risk injury to the hands, wrists, arms, and/or shoulders by repeated operation of one or these devices in a position that is not ergonomically correct.

BRIEF DESCRIPTION OF THE DRAWINGS

Various embodiments of the present disclosure will be understood more fully from the detailed description given below and from the accompanying drawings of various embodiments of the invention.

FIG. 3A illustrates a perspective view of another case with wings having finger openings where the wings are in a closed position, according to an embodiment.

FIG. 3B illustrates a perspective view of the case of FIG. 3A with the wings having finger openings where the wings are in an open position, according to an embodiment.

FIG. 4B illustrates a close-up view of the case of FIG. 4A being held by a person, according to an embodiment.

FIG. 4C illustrates a different perspective view of the case of FIG. 4A in a closed position, according to an embodiment.

FIG. 5A illustrates a perspective view of an add-on accessory for a device, where the add-on accessory has wings in a closed position, according to an embodiment.

FIG. 5B illustrates a perspective view of the add-on accessory of FIG. 5A with the wings in an open position, according to an embodiment.

FIG. 9C illustrates a rear view the case of FIG. 9A, according to an embodiment.

FIG. 9D illustrates a front view the case of FIG. 9A, according to an embodiment.

DETAILED DESCRIPTION

Figure 1A:
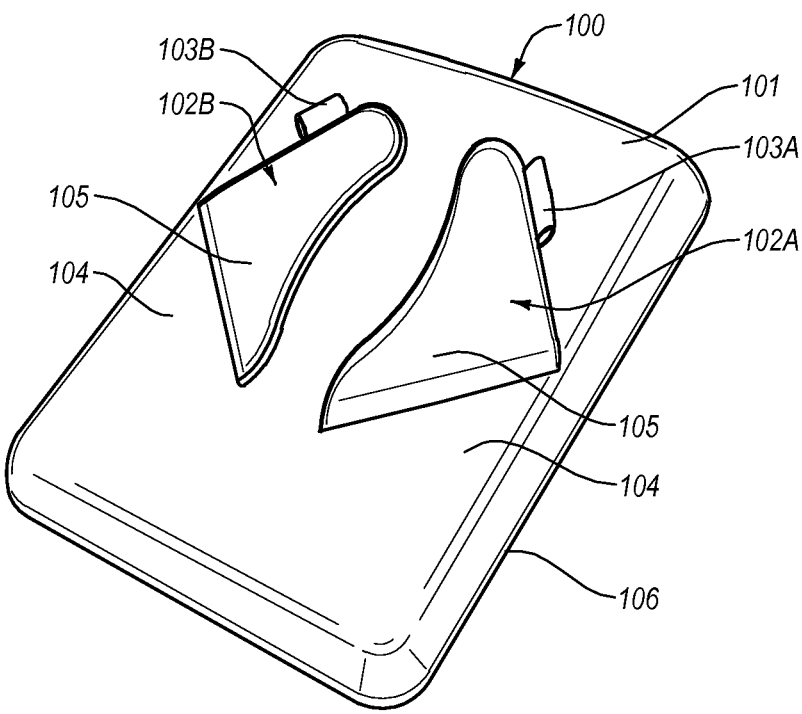
FIG. 1A illustrates a perspective view of a case with wings in a closed position, according to an embodiment.

Conventionally, device users may desire to protect their electronic devices using cases. Such cases, however, are typically not designed with ergonomics in mind and are often difficult to hold for a prolonged amount of time. This is problematic for many device users who are increasingly using their electronic devices for more tasks throughout the day. Such users are faced with either continuing to use their electronic devices in spite of discomfort they may feel, or reducing the use of their electronic devices.

Aspects of the present disclosure addresses these and other shortcomings of conventional approaches. Described herein is a winged apparatus that can be an ergonomic case for electronic devices (e.g., electronic tablets, eReaders, mobile phones, and other handheld electronic devices). In some embodiments, the winged apparatus can be an add-on accessory that may be attached to any electronic device. The winged apparatus can include one or more wings that extend outwardly from the electronic device, such as in a direction that is substantially parallel to a display of the electronic device. The positioning of the wings of the winged apparatus permit the electronic device to which they are attached to rest in the hands of the device user. Because the wings, and the electronic device by extension, are supported by resting on the device user's hands, the user may relax her grip which can provide ergonomic benefits to the device user. For example, by resting the wings between the thumb and index finger (an area referred to as the "thenar space"), the winged apparatus provides a significant reduction in grip tension (the need to pinch the device with the thumb and fingers). Moreover, the positioning of the wings provides further benefits because it can straighten the wrist(s) of the device user, which allows the device user to rest their hands and wrists in a substantially straight, ergonomic position.

The winged apparatus also makes the mobile experience more comfortable by providing the device user with various options to grip their electronic device in a way the user deems comfortable, without requiring excessive use of the thumb and fingers. The winged apparatus accomplishes this by allowing the user to adjust their position as much as necessary while using the wings to grip the device in various ways (e.g. the wings can rest between the index finger and middle finger, not just the thumb and index finger, and so on). Additionally, the user has the option to use one or both wings, depending on their desired position/situation, and dependent on the user being right-handed or left-handed. The winged apparatus relieves hand stress by requiring less pressure to grip a mobile device, specifically by resting the "wings" of the winged apparatus on one's hand, or by balancing the wings on one's lap, pillow, bed, chair, ground, beach or anywhere else one may decide to read. The wings can also perform as a stand.

In some embodiments, the winged apparatus is a case that substantially surrounds an electronic device, as illustrated in FIGS. 1A-B, 2, 3A-B, 4A-C and 9A-D. In other embodiments, the winged apparatus is an add-on accessory that attaches to an electronic device, as illustrated in FIGS. 5A-B, 6A-B, 7A-B, and 8A-B.

FIG. 1A illustrates a perspective view of a case 100 with one or more wings 102 in a closed position, according to an embodiment. The case can have a base portion 101 with a planar surface 104 to which the one or more wings 102 are attached. As illustrated, two wings 102A, 102B are attached at a pivot point 105 to the base portion 101. A pivot point 105 can be any structure or mechanism that permits a wing to move. The illustrated pivot point 105 is a flexible hinge that is disposed along a linear axis that permits the attached wing 102 to rotate (open and close) about the axis. The pivot point 105 can be arranged at an angle such that when the wing 102 is in a closed position, it does not extend beyond the case 100 and when the wing 102 is in an open position, the wing 102 extends beyond the case 100.

The wing 102 may also include a tab 103 that helps a device user grip the wing 102. The tab can be pliable material (e.g., cloth, plastic, etc.) that can flex and conform to the device user's fingers. By grabbing and pulling on a tab 103, the device user can open or close the wing 102. As illustrated, each wing 102A, 102B has a corresponding attached tab 103A, 103B.

The case 100 may also have a depth portion 106 that substantially surrounds an electronic device (not shown). The dimensions of the depth portion 106 can be any size and can be customized to accommodate any shape of any electronic device.

Figure 1B:
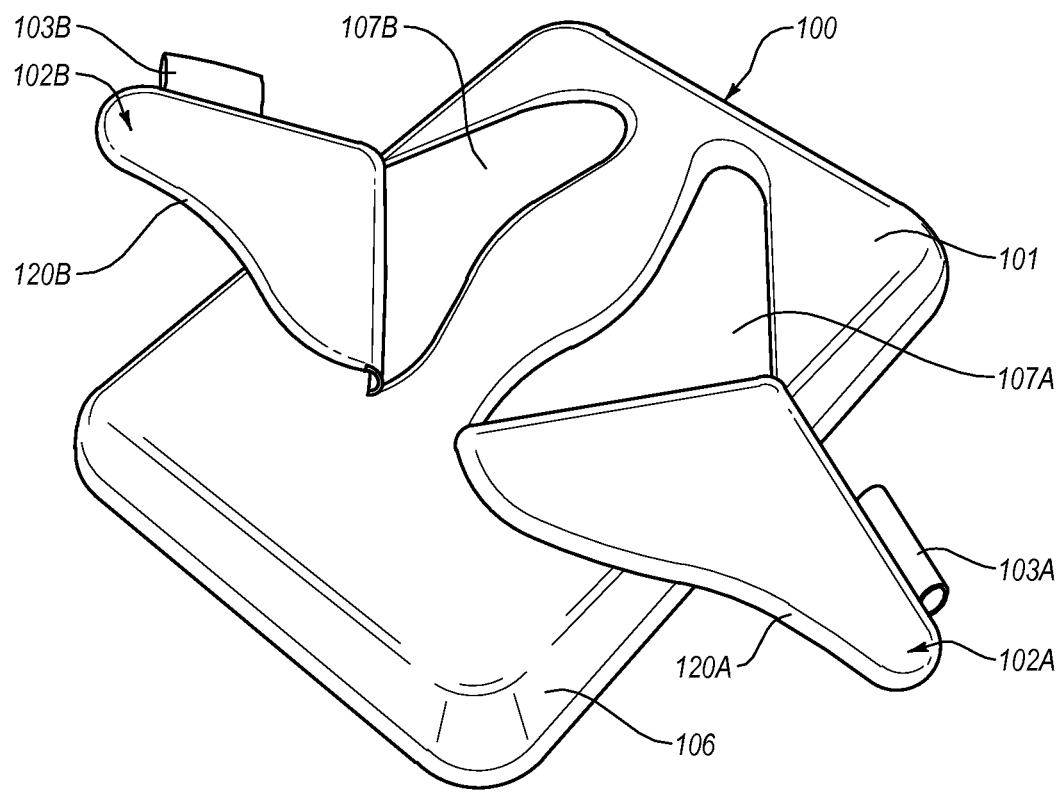
FIG. 1B illustrates a perspective view of the case of FIG. 1A with the wings in an open position, according to an embodiment.

FIG. 1B illustrates a perspective view of the case 100 of FIG. 1A with the wings 102 in an open position, according to an embodiment. The base portion 101 of the case 100 may have one or more recesses 107. The one or more recesses 107 can correspond to a wing 102 and each recess 107 can be formed in a shape that is similar to its respective wing 102. In some embodiments, each recess 107 can be configured to receive its respective wing 102. When in the retracted (closed) position, the wing 102 can be nested in the recess 107 and can be flush with the planar surface 104 of the base portion 101. As illustrated, the case 101 has two recesses 107A, 107B that correspond to wings 102A, 102B, respectively.

A wing 102 may also have a radius 120 on at least one edge. The radius may be any size or dimension and is configured to reduce sharp edges and increase comfort for a device user who may be holding the case 100 with their hand(s).

Figure 2:
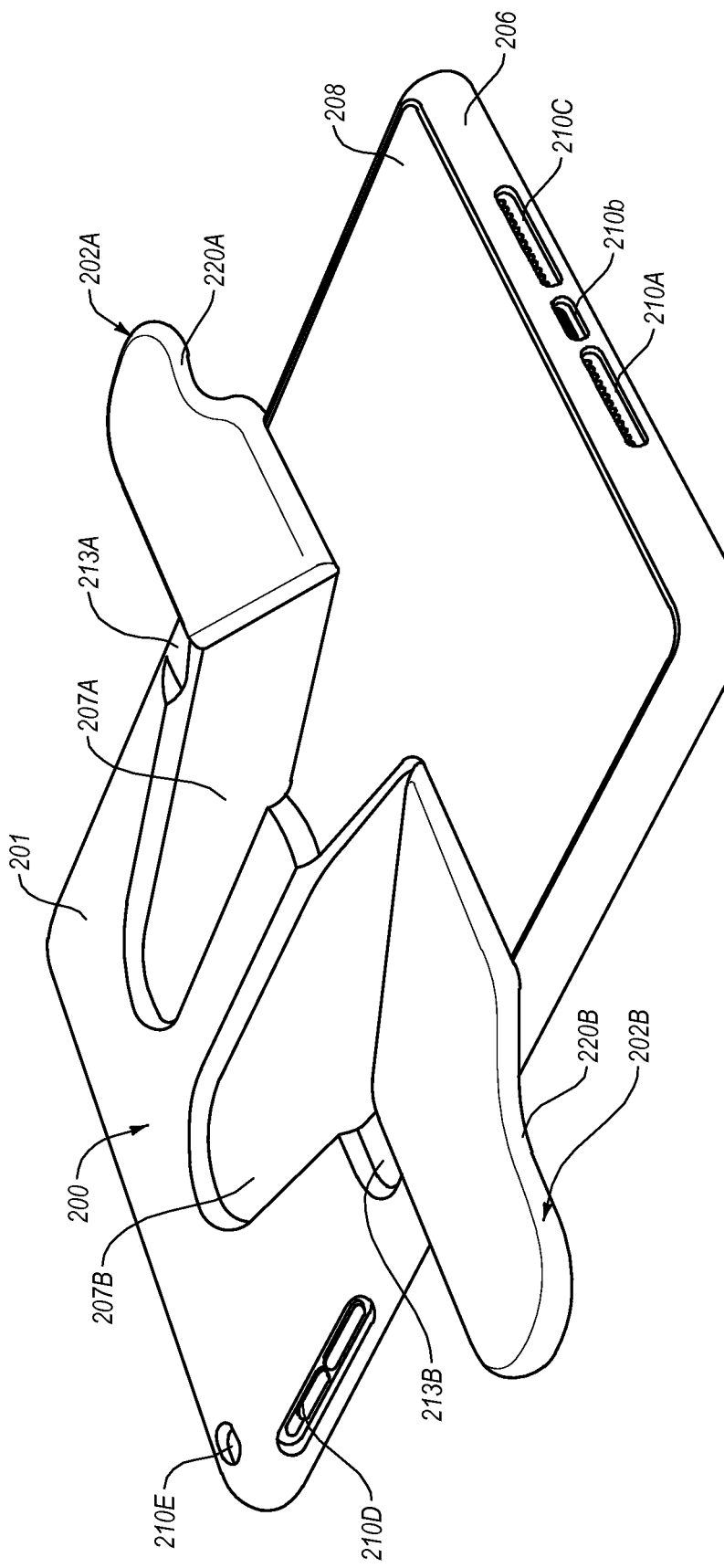
FIG. 2 illustrates a perspective view of another case having wings in an open position, according to an embodiment.

FIG. 2 illustrates a perspective view of another case 200 having wings 202 in an open position, according to an embodiment. The case 200 can have a planar surface 201, one or more wings 202A, 202B hingably attached to the case, a depth portion 206, and one or more recesses 207A, 207B (similar to the one or more recesses 107 of FIG. 1). Similar to the wings 102 of FIGS. 1A-B, the wings 202 can have a radius 220 of any shape or dimension. As illustrated wing 202A has a radius 220A and wing 202B has a radius 220B. In some embodiments, the wing 202 tapers as it extends away from the case 200. The case 200 can also have a second planar surface 208 that is substantially parallel to the first planar surface 201.

The case 200 can also have one or more through-hole cutouts 210 on any portion. For example, as illustrated, the depth portion 206 has cutouts 210A-C to accommodate speakers and a power cord of an electronic device and cutout 210D to accommodate various buttons of the electronic device (e.g., power button, volume buttons). Also as illustrated, the first planar surface 201 includes cutout 210E, which may be to permit a camera of the electronic device to be useable while the case is attached to the electronic device.

The case 200 also can include at least one indentation 213 to allow the device user to insert their finger under the wing 202 and pull out the wing 202. As illustrated, the case 200 includes two indentations 213A, 213B, with each indentation corresponding to a respective wing 202A, 202B.

FIG. 3A illustrates a perspective view of another case 300 with wings 302A, 302B having finger openings 303A, 303B where the wings 302A, 302B are in a closed position, according to an embodiment. Also illustrated, case 300 includes at least one planar surface 301, 308 and a cutout 310, as described herein.

FIG. 3B illustrates a perspective view of the case 300 of FIG. 3A with the wings 302A, 302B having finger openings 303A, 303B where the wings 302A, 302B are in an open position, according to an embodiment. The case 300 includes at least one planar surface 301, 308, a depth portion 306, at least one recess 307 (two recesses 307A, 307B shown) and cutout 310. Each wing 302A, 302B is also illustrated as having a radius 320A, 320B, as described herein.

Figure 4A:
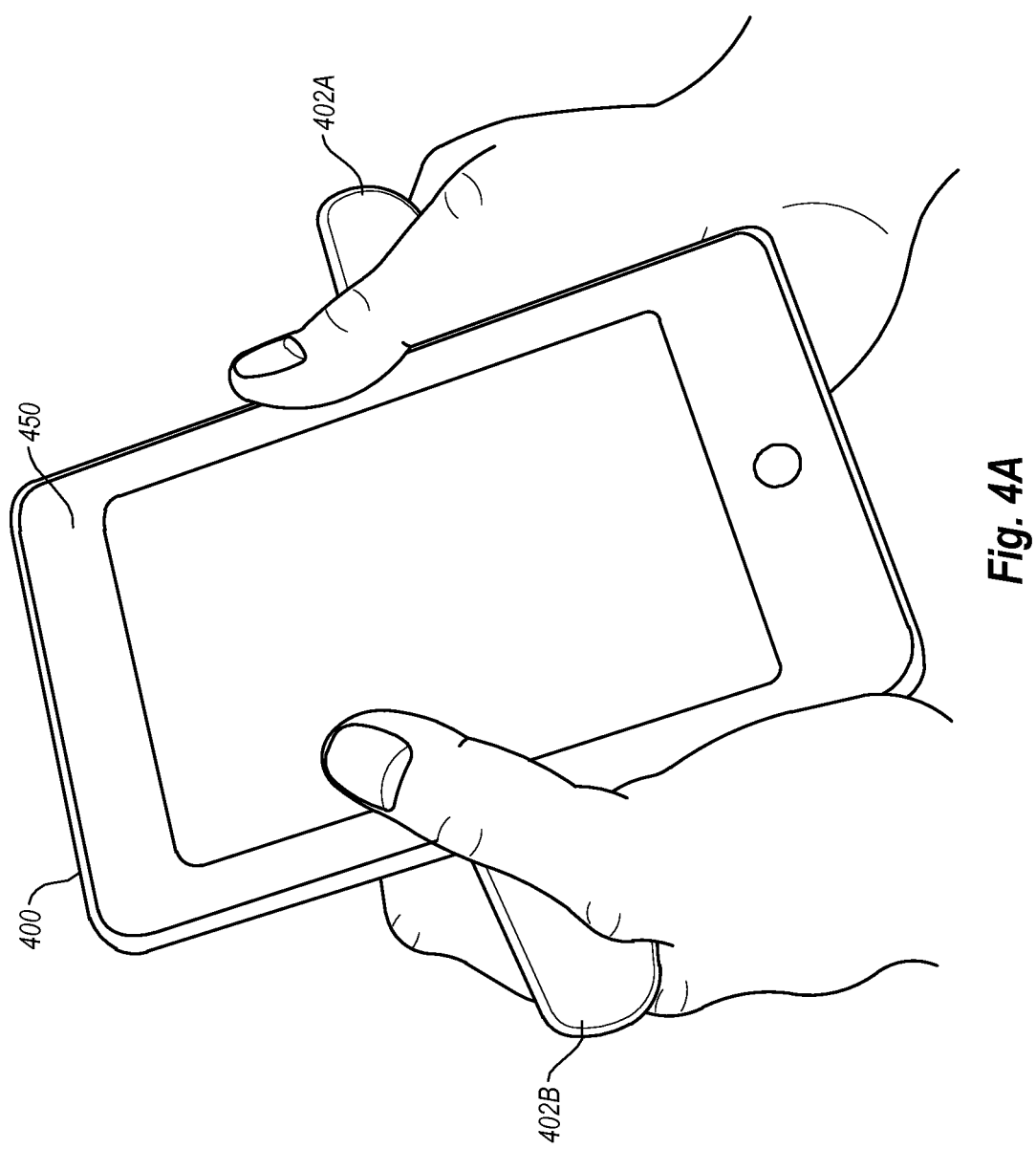
FIG. 4A illustrates a front perspective view of another case with wings being held by a person, according to an embodiment.

FIG. 4A illustrates a front perspective view of another case 400 with wings 402A, 402B being held by a person, according to an embodiment. As illustrated, the case 400 is attached to an electronic device 450.

FIG. 4B illustrates a close-up view of the case 400 of FIG. 4A being held by a person, according to an embodiment. As illustrated, the case 400 is attached to electronic device 450. Wing 402B is in a fully open position and extends outward from the case 400 and is substantially parallel to a planar surface (not shown) of the case 400. In some embodiments, when in the fully open position, the wing 402B is substantially parallel with a user-facing surface (e.g., a screen) of the electronic device 450.

To hold the case 400, and the electronic device 450 by extension, the device user can rest the wing 402B on their hand 480A. For example, device user can rest the wing 402B the in a position 483A between their thumb 481A and index finger 482A. While the wing 402B rests on this position 483A, the user may choose to relax their grip on the case 400 and/or the electronic device 450.

FIG. 4C illustrates a different perspective view of the case 400 of FIG. 4A where wings 402A, 402B are in a closed position, according to an embodiment. Also illustrated, the case 400 includes two planar surfaces 401, 408, a depth portion 406, a cutout 410, and two recesses 420A, 420B, as described herein. The two planar surfaces 401, 408 are on two different planes such that there is a distance between the two planar surfaces 401, 408. In this embodiment, the case 400 also has a transition portion 440 between the two planar surfaces 401, 408. The transition portion 440 can be surface connects the two planar surfaces 401, 408 and may be substantially perpendicular to each of the two planar surfaces 401, 408. In some embodiments, the transition portion 440 can have one more rounded or chamfered edges. In further embodiments, and as illustrated, a wing 402 may be disposed adjacent to the transition portion 440 such that the wing 402 has an upper portion that is substantially flush with the first planar surface 401 and a lower portion that is substantially flush with the first planar surface 408 when the wing 402 is in the closed position. The transition portion 440 can follow any path. As illustrated, the transition portion 440 follows a curved path and the wing 402 can be formed to also follow the path of the transition portion 440.

FIG. 5A illustrates a perspective view of an add-on accessory 500 for a device 550, where the add-on accessory has wings 502 in a closed position, according to an embodiment. The add-on accessory 500 can attach to the electronic device 550 in myriad ways, such as by using an adhesive (e.g., tape, glue), hook and loop device (e.g., Velcro®), elastic cords or bands, etc. The add-on accessory 500 can be any shape or size. In some embodiments, the add-on accessory 500 extends laterally from one side to the other side a distance equal or less than a lateral distance of the electronic device 550. In some embodiments, the geometric footprint of the add-on accessory 500 is smaller than a geometric footprint of the electronic device 550.

Similar to the case 100 of FIG. 1, the add-on accessory 500 can include a planar surface 501 and one or more wings 502. As illustrated, two wings 502A, 502B include respective finger openings 503A, 503B, similar to those described in conjunction with FIGS. 3A-B.

FIG. 5B illustrates a perspective view of the add-on accessory 500 of FIG. 5A with the wings in an open position, according to an embodiment. The case add-on accessory 500 includes at least one planar surface 501, at least one recess 507 (two recesses 507A, 507B shown) and cutout 310. Each wing 502A, 502B is also illustrated as having a radius 520A, 520B, as described herein.

Figure 6B:
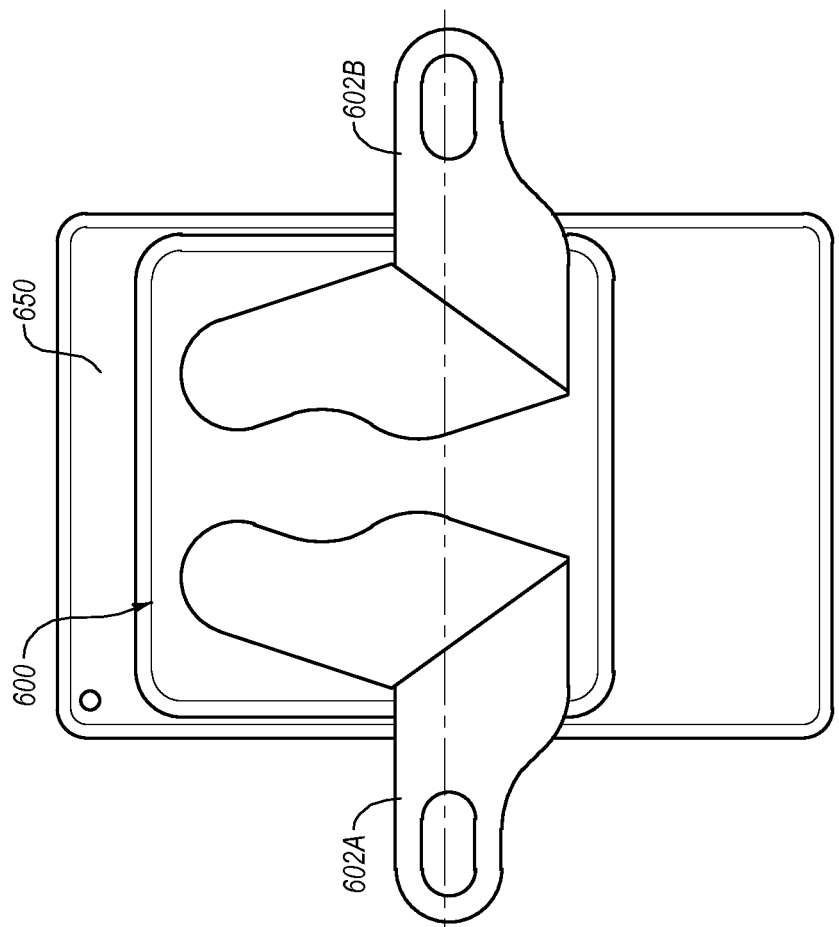
FIG. 6B illustrates a perspective view of the add-on accessory of FIG. 6A with the wings in an open position, according to an embodiment.
Figure 6A:
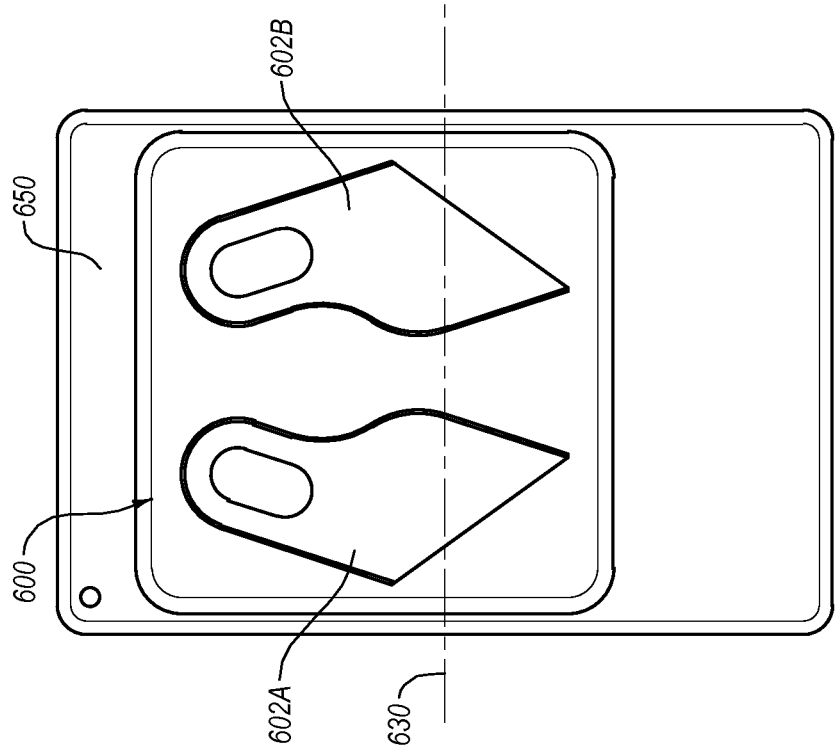
FIG. 6A illustrates a perspective view of another add-on accessory for a device, where the add-on accessory has wings in a closed position, according to an embodiment.

FIG. 6A illustrates a perspective view of another add-on accessory 600 for a device, where the add-on accessory 600 has wings 602A, 602B in a closed position, according to an embodiment. The add-on accessory 600 can have wings of any shape and size and can include finger hole, as described herein. FIG. 6B illustrates a perspective view of the add-on accessory 600 of FIG. 6A with the wings in an open position, according to an embodiment. The add-on accessory 600 can be positioned anywhere on an electronic device 650, such as with more of the add-on accessory 600 being above a central axis 630 of the electronic device 650, as illustrated.

Figure 7B:
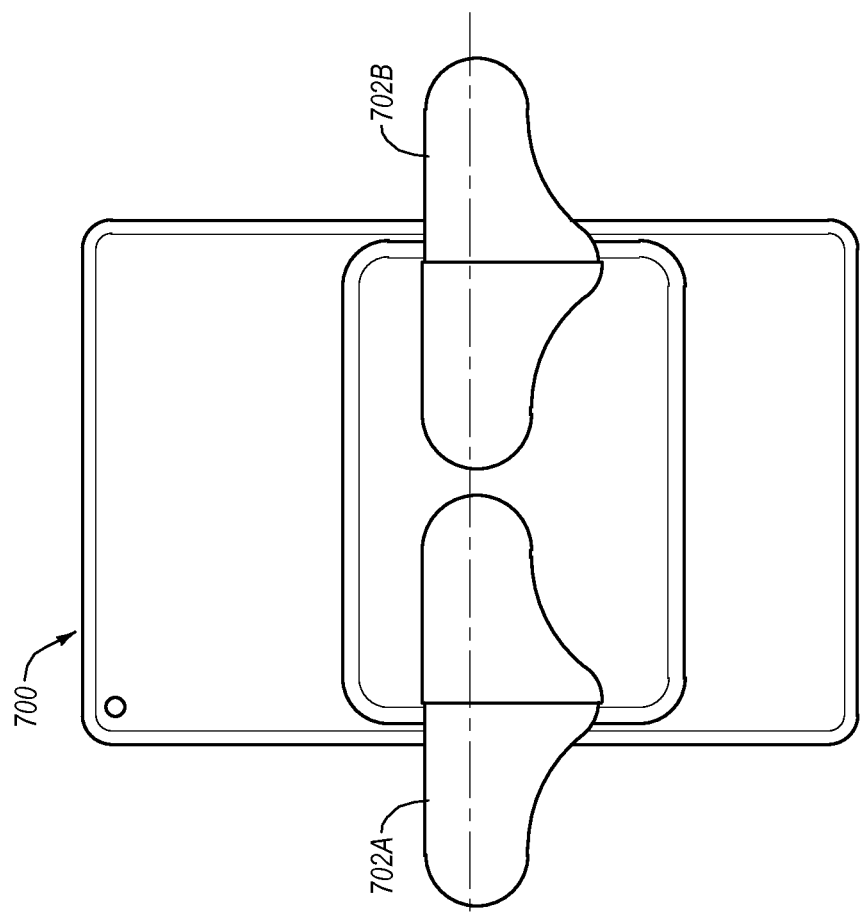
FIG. 7B illustrates a perspective view of the add-on accessory of FIG. 7A with the wings in an open position, according to an embodiment.
Figure 7A:
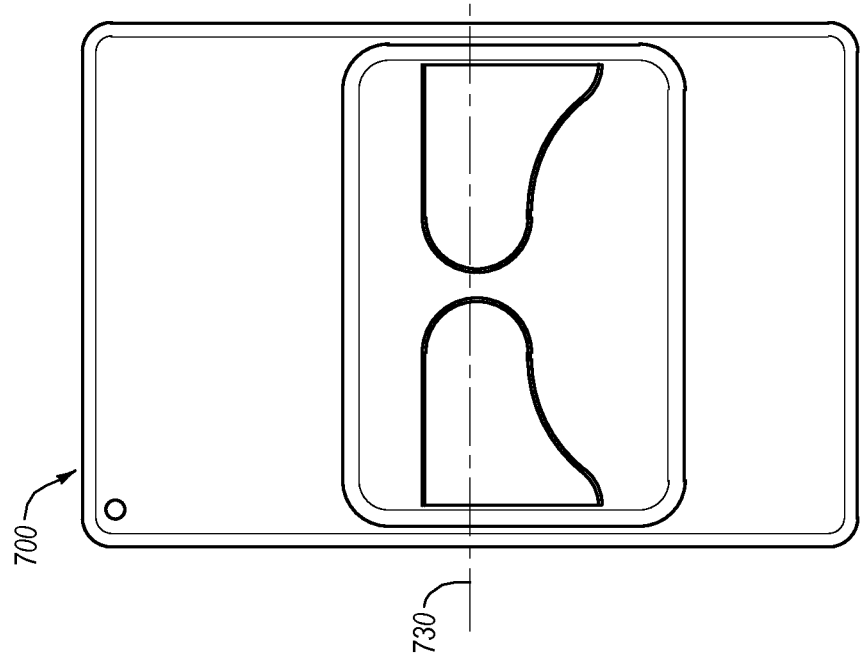
FIG. 7A illustrates a perspective view of another add-on accessory for a device, where the add-on accessory has wings in a closed position, according to an embodiment.

FIG. 7A illustrates a perspective view of another add-on accessory 700 for a device, where the add-on accessory 700 has wings 702A, 702B in a closed position, according to an embodiment. The add-on accessory 600 can have wings of any shape and size. FIG. 7B illustrates a perspective view of the add-on accessory 700 of FIG. 7A with the wings in an open position, according to an embodiment. The add-on accessory 700 can be positioned anywhere on an electronic device 750, such as with more of the add-on accessory 700 being below a central axis 730 of the electronic device 750, as illustrated.

Figure 8B:
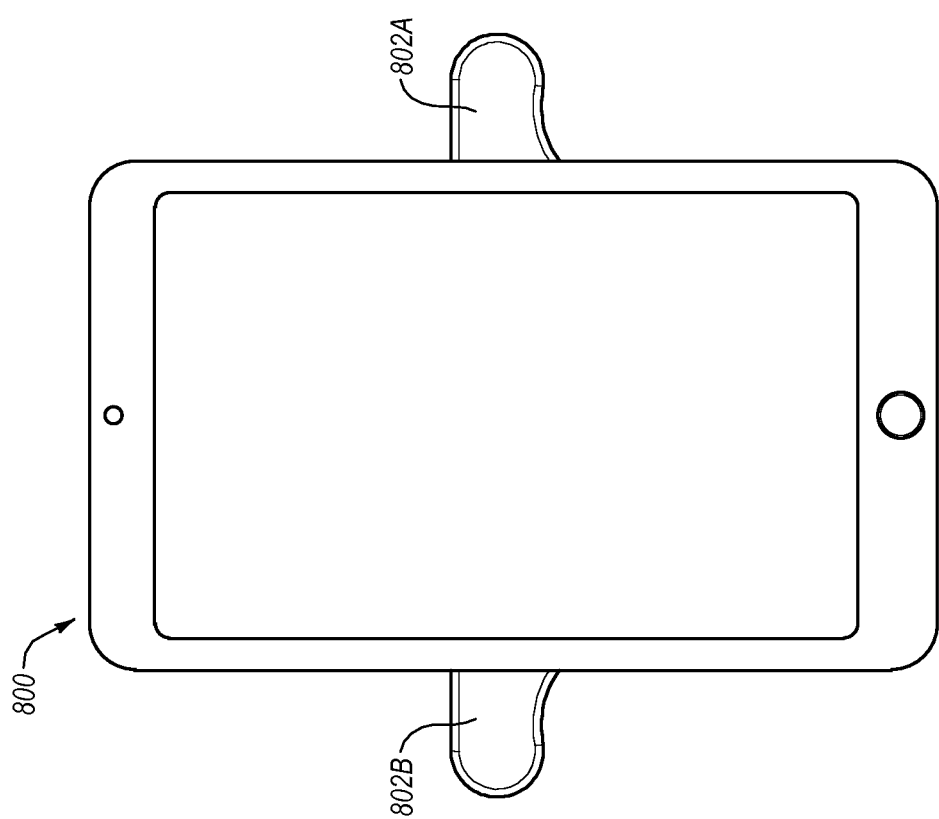
FIG. 8B illustrates a rear view of the add-on accessory of FIG. 8A with the wings in an open position, according to an embodiment.
Figure 8A:
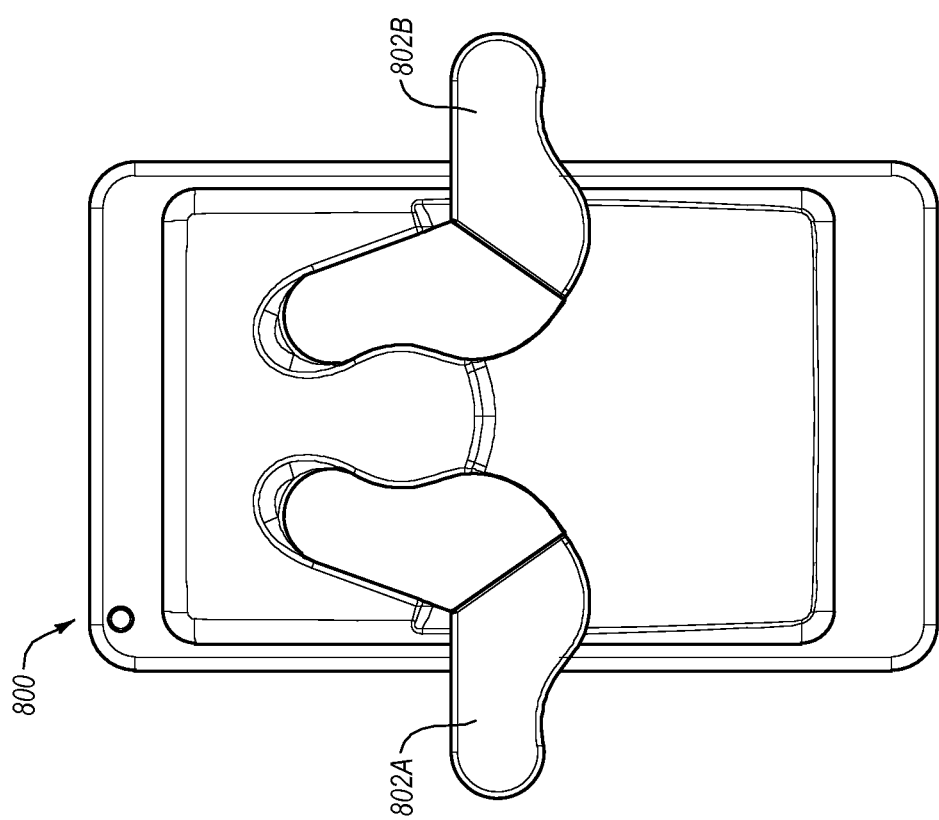
FIG. 8A illustrates a front view of another add-on accessory for a device, where the add-on accessory has wings in an open position, according to an embodiment.

FIG. 8A illustrates a front view of another add-on accessory 800 for a device, where the add-on accessory has wings 802 in an open position, according to an embodiment.

FIG. 8B illustrates a rear view of the add-on accessory 800 of FIG. 8A with the wings 802 in an open position, according to an embodiment.

Figure 9A:
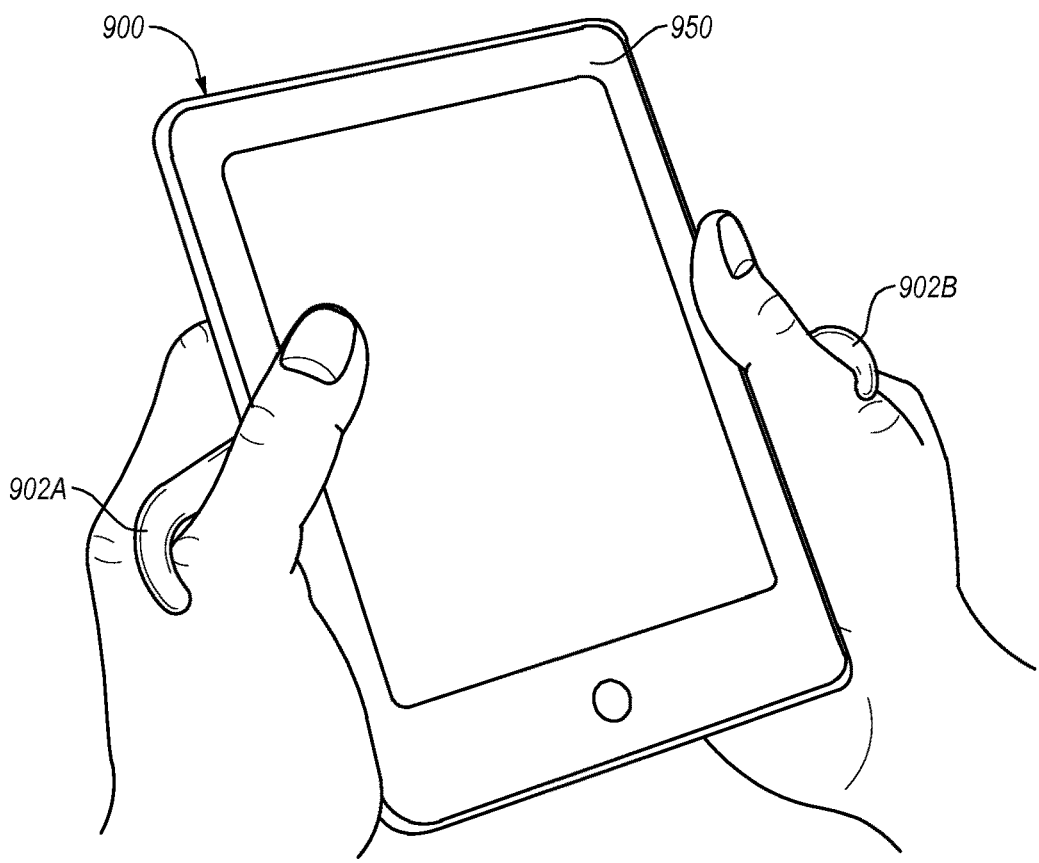
FIG. 9A illustrates a perspective view of another case with wings in an open position, according to an embodiment.
Figure 9B:
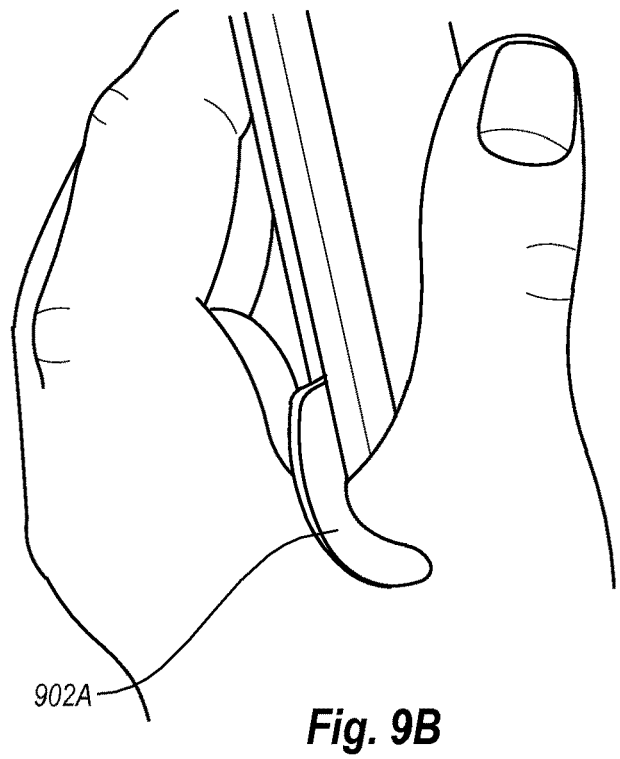
FIG. 9B illustrates a close-up view the case of FIG. 9A, according to an embodiment.

FIG. 9A illustrates a perspective view of another case 900 with wings 902A, 902B in an open position, according to an embodiment. The wings 902A, 902B can be hook-shaped and can be formed according to contours of a human hand. In some embodiments, the hook-shaped wings 902A, 902B are formed according to an average shape and size of a human hand. FIG. 9B illustrates a close-up view the case 900 of FIG. 9A with hook-shaped wings 902A, 902B, according to an embodiment.

FIG. 9C illustrates a rear view the case 900 of FIG. 9A with hook-shaped wings 902A, 902B, according to an embodiment. FIG. 9D illustrates a front view the case 900 of FIG. 9A with hook-shaped wings 902A, 902B, according to an embodiment. The case 900 can included recesses 907A, 907B that are configured to receive the hook-shaped wings 902A, 902B, as described herein.

The shapes and sizes of the wings described herein vary from what is illustrated in the Figures. In some embodiments, the wings have a height of 1 inch or more, as measured from the base to the outermost edge. The width (e.g., thickness) may be any size or dimension. In one embodiment, the width of the wings may taper from one end to the other. For example, the wings may have a larger width at the end where they attach to the case and may either gradually or otherwise taper to a narrower width as they approach the opposite end. Accordingly, the user may pace his or her hands at a location on the wings where the width provides for the most comfortable resting position. Depending on the embodiment, the taper may be straight, curved, arched, or otherwise. In some embodiments, the wings are a smaller, thinner wing that has a height between 0.01-1 inches, as illustrated in FIGS. 9A-D. In another embodiment, the smaller wings resemble an arched pencil extending from the side of the case, essentially hooking over the hand to support the weight of the device without undue effort, as illustrated in FIGS. 9A-D.

The wings can be movable. In some embodiments, the wings have an extended position (e.g., open) and a retracted position (e.g., closed), as described herein.

In regard to opening the wings, there are several methods. Some embodiments will include a tab on the wing to pull out into the open position. Other models will include an indentation and tab in the wing allowing the user to insert their finger under the wing and pull out. Another variation includes a hole in the tip of the wing to insert finger and pull wing out.

The wings can be are fixable to a planar surface of the case when in a closed and/or in an open position. For example, fixing or fastening the wings securely in the open and closed positions may involve the use of magnets, snaps, and/or hinge locks.

The various embodiments of the winged apparatus described herein includes various options such as: (a) only one wing (b) the wing(s) being placed at different locations around the edge of the case/accessory (top, bottom, left, right, and at any position along the edge of the device that may be of ergonomic value to the user. For example, instead of putting the wings in the center on each side, they may be placed near the top portion of each side, to allow for different preferred reading positions. Additional versions include adjustable wings—ones that slide up and down the edge of the case or from side to side. The winged apparatus may be made with various types of rubber and plastic, with flex handles that can fold behind or in front of the tablet. Whether there is one or two wings (or more), they will be flexible enough to bend and fold in order to store the winged apparatus in a small space. Another version of the winged apparatus design includes static wings (non-folding, permanently in the out position).

The winged apparatus may utilize multiple methods for fastening to the electronic device securely. The most common methods and materials used to fasten the electronic device to the winged apparatus may include: elastic bands to securely fasten each of the four corners of the electronic device, a stretchy fabric in which the electronic device can slide into, hard plastic "hooks" (as an extension of a plastic body) that click into holes on the various styles of electronic device, solid wood or bamboo to fasten the electronic device to the case, flexible rubber housing (which may allow for the user to snap in the electronic device to a form-fitted housing that is only slightly larger than the perimeter of the electronic device, a hook and loop portion on some part of winged apparatus to attach the device to various surfaces (e.g. a hook and loop device strap on a wall, or anything else hook and loop that someone would like to hang an electronic device from), and the like.

In some embodiments, the electronic device can be made of a discardable or recyclable material such as paper, which could be used more for travel, and can be discarded after use.

The winged apparatus can be manufactured using various types of materials, such as plastic, wood, bamboo, rubber, fabric, hook and loop device, Velcro®, metal, elastic, leather, magnets, and/or paper. Some embodiments of the winged apparatus may be made of all plastic and rubber, while others will be made partially of bamboo.

What is claimed is:

1. An electronic device case comprising:
a case body for a handheld electronic device, the case body comprising at least one planar surface, the planar surface being substantially rectangular in shape having a first edge and a second edge that is substantially perpendicular to the first edge;
a central axis of the case body extending perpendicular to the first edge and parallel to the second edge; and
a first wing to extend past the first edge of the at least one planar surface in a first position and to fold into the planar surface in a second position, wherein the first wing is attached at a first end to the case body at a fixed axis of rotation, wherein the first wing is rotatable between the first position and the second position along the fixed axis of rotation, wherein when in the first position, a wing axis is parallel to the central axis of the case body, the first wing extending in a first direction along the wing axis toward the first edge when in the first position, the first wing extending in a second direction along the wing axis toward the second edge when in the second position, wherein when in the second position, the wing axis is not parallel to the central axis of the case body, the first wing to provide a handle by which a user of the handheld electronic device can support a weight of the handheld electronic device.

2. The electronic device case of claim 1, wherein the first wing comprises a tab.

3. The electronic device case of claim 1, wherein the first wing has a finger opening.

4. The electronic device case of claim 1, wherein the first wing is fixable to the planar surface in the second position.

5. The electronic device case of claim 4, wherein the first wing is fixable to the planar surface in the second position via a magnet.

6. The electronic device case of claim 4, wherein the first wing is fixable to the planar surface in the second position via a hinge lock.

7. The electronic device case of claim 4, wherein the first wing is fixable to the planar surface in the second position via a snap.

8. The electronic device case of claim 1, wherein the first wing tapers as the first wing extends away from the case body.

9. The electronic device case of claim 1, wherein the first wing supports the handheld electronic device as a stand in a third position.

10. An electronic device accessory comprising:
a body to attach to a handheld electronic device, the body comprising at least one planar surface, the planar surface having a first edge and a second edge that is orthogonal to the first edge; and
a first wing to extend past the first edge of the at least one planar surface in a first position and to fold into the planar surface in a second position, wherein the first wing is attached at a first end to the body at a fixed axis of rotation, wherein the first wing is rotatable between the first position and the second position along the fixed axis of rotation, a central axis of the body extending perpendicular to the first edge and parallel to the second edge, the central axis being parallel with an axis of the first wing when in the first position, the axis of the first wing intersecting with the first edge when in the first position, the axis of the first wing intersecting with the second edge when in the second position.

11. The electronic device accessory of claim 10, wherein the body attaches to the handheld electronic device via an adhesive.

12. The electronic device accessory of claim 10, wherein the body attaches to the handheld electronic device via a hook and loop device.

13. The electronic device accessory of claim 10, wherein the first wing comprises a tab.

14. The electronic device accessory of claim 10, wherein the first wing has a finger opening.

15. The electronic device accessory of claim 10, wherein the first wing is fixable to the planar surface in the second position.

16. The electronic device accessory of claim 10, wherein the first wing supports the handheld electronic device as a stand in a third position.

17. A device, comprising:
a body configured to attach only to a single surface of an electronic device, the body comprising at least one planar surface, the planar surface having a first edge and a second edge that is orthogonal to the first edge;
a central axis of the body extends perpendicular to the first edge and parallel to the second edge; and
a wing attached at a first end to the body at a fixed axis of rotation, the wing being rotatable between a first position and a second position along the fixed axis of rotation, the wing being oriented in a first direction along a wing axis toward the first edge when in the first position, the wing being oriented in a second direction along the wing axis toward the second edge when in the second position, wherein when in the first position, the wing axis is parallel to the central axis of the body, wherein when in the second position, the wing axis is not parallel to the central axis of the body.

18. The device of claim 17, wherein the wing is configured to extend past the edge of the at least one planar surface when in the first position.

\* \* \* \* \*